Sept. 7, 1965  G. W. THOMPSON  3,204,473
ADJUSTMENT MEANS FOR TRUCK TYPE REAR VISION MIRRORS
Filed Feb. 12, 1962

INVENTOR.
Gifford W. Thompson
BY Scott L. Norviel
Atty.

United States Patent Office 3,204,473
Patented Sept. 7, 1965

3,204,473
ADJUSTMENT MEANS FOR TRUCK TYPE
REAR VISION MIRRORS
Gifford W. Thompson, 411 Roberts Road, Tempe, Ariz.
Filed Feb. 12, 1962, Ser. No. 172,401
5 Claims. (Cl. 74—96)

This invention concerns an adjustment means for truck type exterior rear vision mirrors.

Heretofore numerous types of adjustment means have been made for the large, truck type rear vision mirrors. Most of these devices have failed in common use because of their complication and the difficulty in applying them to truck cab bodies and of manipulating them after they were installed.

One of the objects of this invention is to provide a simple sturdy mechanism for adjusting the large size truck type rear vision mirrors which include a mirror surface large enough so that adjustment as to vertical position is not necessary. The adjustment is made in a horizontal plane only.

Another object is to provide a simple and sturdy means for horizontal adjustment of a rear vision mirror on a motor vehicle which will include an adjustment handle in the cab compartment that will indicate proper working limits of the adjustment and will also permit adjustment when necessary beyond the working limits indicated.

Other objects will appear hereinafter.

I attain the foregoing objects by means of the devices, parts, and combinations of parts shown in the accompanying drawings, in which FIGURE 1 is a perspective view of the working parts of my adjustment means with parts broken away to better show construction;

Similar numerals refer to similar parts in the several views.

Figure 2:
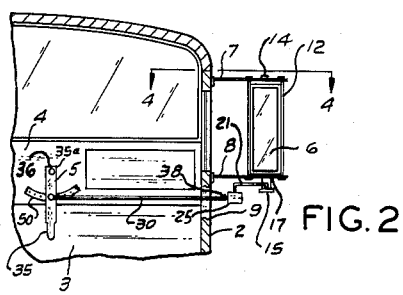
FIGURE 2 is an elevational view of my device as installed in a cab of an automotive vehicle and drawn on a smaller scale.
Figure 3:
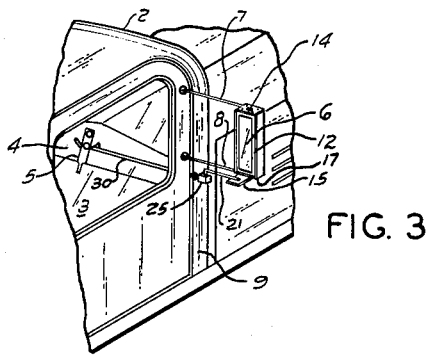
FIGURE 3 is a perspective view of the device as shown in FIGURE 1 and showing the door of the driving compartment.

In the drawings, 2 indicates the forward part of the body with cab which includes the driver's compartment 3 occupied by the operator of the truck. Within this compartment and attached to the dashboard wall 4, I provide an operating lever 5 which will adjust and change the angle of the mirror 6 by means of the mechanism hereinafter described.

The mirror 6, here concerned, is supported on two substantially horizontal struts 7 and 8 which position the mirror a substantial predetermined distance outward from the side 9 of the body of the driver's compartment 3.

The mirror is held in a frame 12 and this frame is supported by pivots 14 on the ends of the outrigger struts 7 and 8. The mirror is normally set at an angle which will enable the driver in the compartment 3 to observe the reflection of vehicles and the road in back of the right side of the vehicle on which the device is mounted. It is the purpose of this device to vary this angle so that the driver can observe the reflected image close to the rear of the truck or at a distance therefrom so that he has a broadened field of view, and can observe a trailer which may be attached to the truck.

Figure 4:
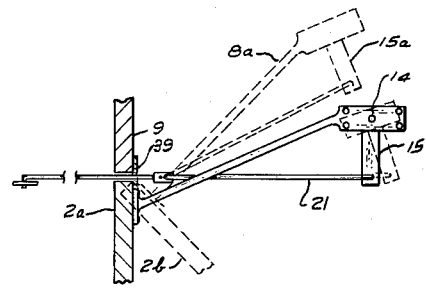
FIGURE 4 is a horizontal sectional view of the device as installed in a motor vehicle cab with portions of the door and door frame sectioned on line 4—4 of FIGURE 2.
Figure 5:
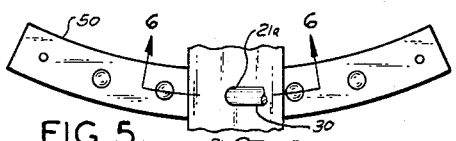
FIGURE 5 is a plan view of portions of the operating lever and the attachment base for the lever.
Figure 6:
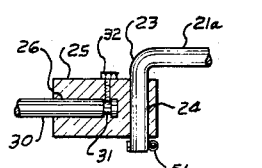
FIGURE 6 is a section of the operating lever and base taken on line 6—6 of FIGURE 5.

To accomplish this adjustment, the frame 12, aside from being pivoted on the outrigger struts has a radially extending rearwardly directed lever 15 attached to the bottom portion of the frame 12. This lever has a square hole 16 at its inner end to fit over a squared position or other similar portion on the lower part 17 of frame 12. The outer end 18 of this lever is perforated with a round hole 19. This hole is sized and adapted to receive the downwardly curved end portion 20 of the operating rod 21. The inner end portion of operating rod 21 has a downwardly curved portion 23 which works in a hole 24 in the outer end portion of connecting block 25. The inner end portion of block 25 is provided with an axial hole 26 which receives the inner operating rod 30. This rod is provided with an annular groove 31 which receives the inner end of cap screw 32 and is thus removably held in place. The block 25 will rotate slightly with reference to rod 30 but is otherwise stiff and will not bend with reference to rod 30. Therefore the chief purpose of block 25 is to permit the outer end 21 of the operating rod to hinge in a vertical plane with reference to block 25. Note that the inner end of the downwardly bent portion 24 is provided with a cotter key 51 to keep this downwardly bent portion from working out of hole 24 in block 25. The above arrangement of parts is necessary to provide a limited hinging action in the operating rod in order to prevent binding when the door portion 2a (FIGURE 4) is hinged to open position, as shown by dotted lines 2b and permit the opening movement of the mirror struts, which are on the door, to the position indicated by dotted lines 8a and 15a.

As shown in the drawings, the operating lever 5 is pivoted at 36 to the dashboard 4 and has a hand grip 35 which extends downward from the point of pivot to a position where it can be easily grasped by the operator in the cab 3. Note that the inner portion 21a of the composite operating rod is pivotally attached at 38 to the operating lever 5. The inner end of the operating rod 21a is bent downward at 40 and extends through a bearing hole 41 in lever 5. This inner downwardly directed end is provided with a rounded tip 42 and this is disposed so as to resiliently engage in semi-spherical depressions 43, 43a and 43b. These depressions form stops in which the rounded tip of the operating rod may be releasably detained. The operating lever 5 is disposed so that the rounded tip 42 will extend into any one of the semi-spherical depressions and so that the operator may lift the handle portion 35 of the operating lever upwardly a slight distance in order to release it from any one of said depressions, when it is desired to operate the lever and the rod 21 and 21a in order to adjust mirror 6 by means of lever 15. The semi-spherical depressions are placed at predetermined positions on the arcuate base bar 50 which is attached to the dashboard 4 below the pivotal attachment 35a of lever 5. The above described structure provides a releasable detent for holding the lever 5 and consequently mirror 6 at any predetermined angle which will broaden the view of the mirror 6.

Figure 7:
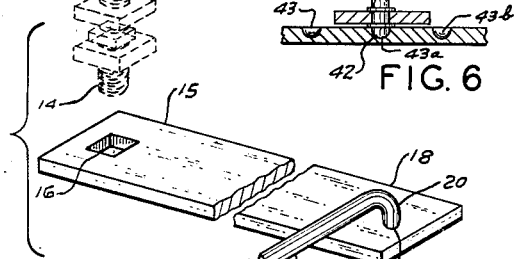
FIGURE 7 is a vertical section of the adjustment block which permits opening and closing the door of the cab without interference with the operating parts of the device here concerned; said section being taken along lines 7—7 of FIGURE 1.
Figure 1:
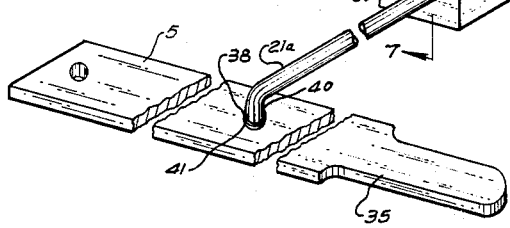

From the foregoing, it will be observed that I have provided a simple and rugged structure for holding and adjusting the angle of mirror 6. In practice I have found that a round steel rod approximately ¼ inch diameter is adequate for the parts 21 and 21a constituting the composite operating rod. The lever 5 may be made of ⅛ inch steel strip. The lever 15 on the bottom of mirror frame 12, can be made of the same size steel strip. Constructed in this way the parts are adequately strong for the purposes intended and will not vibrate when the truck is in operation. Furthermore, the composite operating rod 21—21a is sufficiently rigid so that there is no vibration communicated to the mirror 6 during operation of the truck on which the device is mounted. With the block 25 mounted, as above explained and shown particularly in FIGURE 7, the door 2b may be opened and closed as desired without interference with the adjustment of the mirror. The inner portion 21a of the operating rod may be extended between the door frame 9 and the door 2a. Since the hinges of cab doors of truck type vehicles have their pintles offset outwardly there is always a sufficient space between the door and the door frame to accommodate the ¼ inch rod, such as the operating rod portion 21a. Thus mounting of the device is simple and the operating rod is supported on lever 5 at the inner end and, through block 25 on the lever 18 at the outer end. Also by a notch 39 cut in the rim flange of door frame 9 in which rod part 30 slides.

When installed, as herein described, the mirror 6 in frame 12 may be adjusted as to angle so that the operator has adequate view of the rear end of the truck on which this device is mounted and/or any trailer that may be drawn by the truck. This is quite important because the mirror is normally set to view the rear end of the truck on which it is mounted and normal straight operation. In making a turn with a trailer attached the normal setting of the mirror is entirely inadequate to view the rear of the trailer, and at such times the operator can shift the angle of the mirror by using lever 5 and setting the rounded tip 42 on the inner end of operating rod 21a in any one of the semi-spherical depressions such as 43 for example. This position establishes another angle for the mirror 6 and when this angle is properly predetermined it will enable the operator, without further adjustment, to view the rear end of the trailer. This is very necessary and useful in operating large trucks with attached trailers and makes the use of auxiliary spot mirrors unnecessary.

I claim:

1. A remotely controlled mirror mechanism adapted to be mounted to a truck vehicle having a driver's cab, said mechanism comprising outrigger struts on the side of the truck driver's cab, a mirror having a frame pivotally mounted on said outrigger struts, a lever attached to said frame extending radially therefrom normally in a rearward direction, a two part operating rod having an outer part pivotally connected to the outer end of said lever, and an inner part extending into the driver's cab, an operating lever pivotally attached at one end to a portion of the interior of said cab and having a handle at its free end; the inner end of the inner portion of said operating rod being pivotally attached to the mid-portion of operating lever, latch means on said cab body for detaining said lever at predetermined positions, and a block axially mounted on the outer end of the inner portion of said operating rod and pivotally connected to the inner end of the outer portion of said operating rod.

2. A remotely controlled mirror mechanism adapted to be mounted to a truck vehicle having a driver's cab, a rearwardly disposed door frame with an outwardly hinging door loosely fitting said door frame said mechanism comprising outrigger mirror frame supporting struts extending laterally from said door, a mirror having a frame pivotally mounted on said outrigger struts, a lever attached to said frame extending radially therefrom, normally in a rearward direction, a two part operating rod having an outer part pivotally connected to the outer end of said lever, and an inner part extending into the driver's cab, through the space between the door frame and the door, and an operating lever pivotally attached at one end to a portion of the interior of said cab and having a handle at its free end; the inner end of the inner portion of said operating rod being pivotally attached to the mid-portion of operating lever, latch means on said cab body for detaining said lever at predetermined positions, and a block axially mounted on the outer end of the inner portion of said operating rod and pivotally connected to the inner end of the outer portion of said operating rod.

3. A remotely controlled mirror mechanism adapted to be mounted to a truck vehicle having a driver's cab having a rearwardly disposed door opening and a door frame in said opening with a rim flange on the outside of the rim of said door frame and an outwardly hinging door loosely fitting said door frame to provide a space between the door frame and the door edge, the combination comprising outrigger mirror supporting struts extending laterally from said door, a mirror having a frame pivotally mounted on said outrigger struts on vertical pivots, a lever attached to said frame extending radially therefrom in a rearward direction, a two part operating rod having an outer part pivotally connected to the outer end of said lever, and an inner part extending into the driver's cab through the space between the door frame and the door and through a notch in said rim flange of said door frame, an operating lever pivotally attached at one end to a portion of the interior of said cab and having a handle at its free end; a downwardly extending hinge pin on the inner end of the inner portion of said operating rod pivotally attaching it to the mid-portion of said operating lever, latch means on an arcuate plate on said cab body for detaining said lever at predetermined positions, and a block axially mounted on the outer end of the inner portion of said operating rod and pivotally connected to the inner end of the outer portion of said operating rod.

4. A remotely controlled mirror mechanism adapted to be mounted to a truck vehicle having a driver's cab, a rearwardly disposed door frame with an outwardly hinging door loosely fitting said door frame, said mechanism comprising outrigger struts extending horizontally and laterally from said door, a mirror having a frame pivotally mounted on said outrigger struts, a lever attached to said frame extending radially therefrom, normally in a rearward direction, a two part operating rod having an outer part pivotally connected to the outer end of said lever, and an inner part extending into the driver's cab, through the space between the door frame and the door, and an operating lever pivotally attached at one end to a portion of the interior of said cab and having a handle at its free end, means for temporarily holding said lever in any angular position desired, and a block axially mounted on the outer end of the inner portion of said operating rod and pivotally connected to the inner end of the outer portion of said operating rod.

5. A remotely controlled mirror mechanism adapted to be mounted to the exterior of a vehicle passenger portion having an outwardly hinged door and adapted to be selectively positioned from within said passenger portion, said mechanism comprising a pair of struts extending horizontally and laterally from said door, a vertically elongated mirror surrounded and supported by a frame with said frame pivotally mounted on a vertical axis to the outer end of said struts, a lever fixed to the lower end of said frame and projecting rearwardly, a two part operating rod having on its one end pivotally connected to the lever at its rearward end and projecting horizontally into the passenger portion, an operating lever adapted to be mounted to the passenger portion in the interior thereof, said rod at the other end being mounted to said operating lever, stop means on said operating lever to secure said lever in various positions with the movement of said operating lever moving said two part rod inwardly and outwardly and thereby pivoting said mirror and its frame about its vertical axis, said two part rod comprising two rod portions with a block connecting said rod portions together, said block permitting one of said rods to rotate about a horizontal axis, the other of said rods having a vertically bent end with said block permitting it to rotate about a vertical axis.

References Cited by the Examiner

UNITED STATES PATENTS

| | | | |
|---|---|---|---|
| 521,252 | 6/94 | Anderson | 74—533 |
| 957,474 | 5/10 | Parkes | 74—96 |
| 2,902,902 | 9/59 | Slone | 88—93 |
| 2,962,933 | 12/60 | Hezler | 88—93 |
| 2,977,810 | 4/61 | Stavenan | 74—96 |
| 3,067,628 | 12/62 | Haworth et al. | 74—471 |

BROUGHTON G. DURHAM, *Primary Examiner.*

DON A. WAITE, *Examiner.*